April 21, 1942.  F. WALLER ET AL  2,280,206
MOTION PICTURE THEATER
Filed Sept. 14, 1937   2 Sheets-Sheet 1
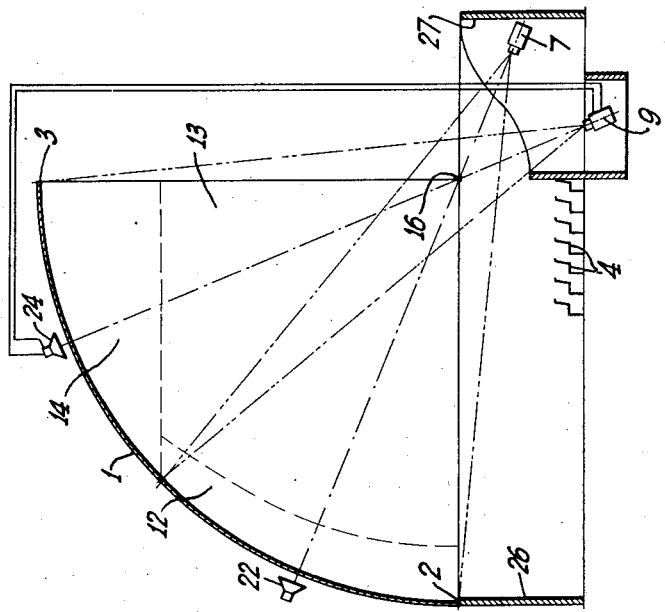
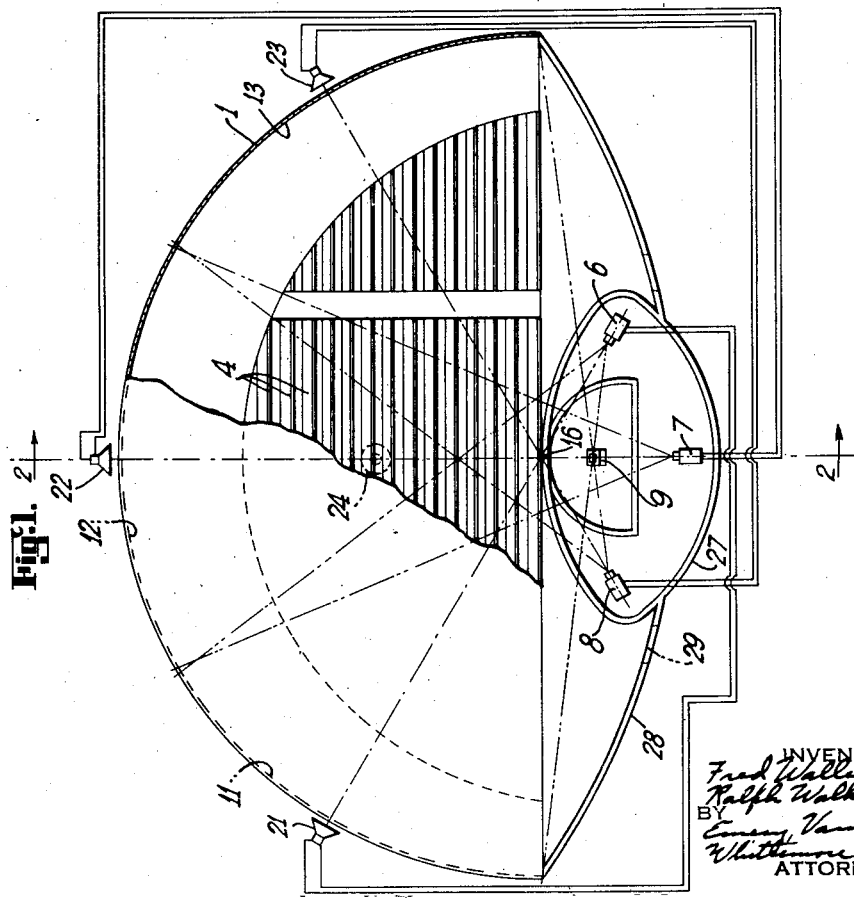

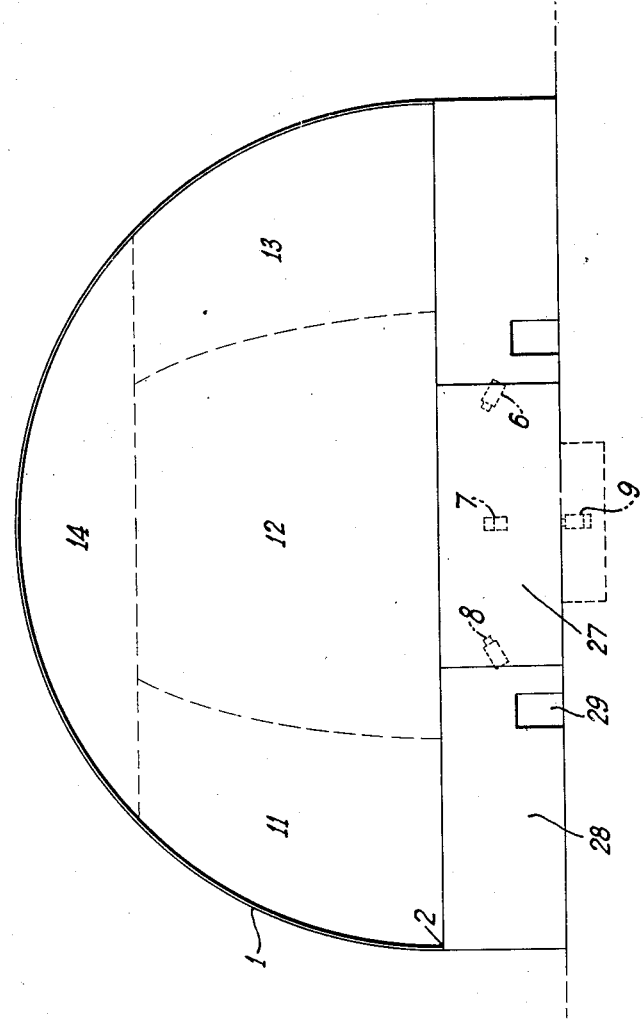

Patented Apr. 21, 1942

2,280,206

UNITED STATES PATENT OFFICE 2,280,206

MOTION PICTURE THEATER

Fred Waller, Huntington, and Ralph Walker, Chappaqua, N. Y., assignors to Vitarama Corporation, New York, N. Y., a corporation of New York Application September 14, 1937, Serial No. 163,712

4 Claims. (Cl. 88—16.2)

This invention relates to motion picture theaters and has for an object the provision of improvements in this art.

In its broadest aspect, it is an object of the invention to product the effect or illusion that the spectator is actually in and surrounded by the environment depicted. For example, if the scene is laid in a forest, the spectator, within his normal field of vision, will see forest on all sides and overhead, so as to produce the illusion that the spectator is in the forest, rather than merely looking at a picture of a forest covering only a small portion of the normal field of vision.

It is a further object of the invention to increase the illusion of being in and surrounded by an environment by producing binaural sound effects. That is, sounds accompanying the action of a picture will appear to the spectator to emanate from the source depicted.

Other objects and advantages of the invention will appear hereinafter.

A preferred embodiment of the invention selected for purposes of illustration is shown in the accompanying drawings, in which, Figure 1 is a top plan view of a theater, with the projection screen partly broken away.

Figure 2 is a section on the line 2—2 of Figure 1, and

Figure 3 is a front elevation.

In the construction of a theater according to our invention, the projection screen is of great area, and is formed with a curved surface extending through any desired arc up to 360° in the horizontal plane, and through an arc of approximately 90° in the vertical plane, that is, from the horizon to the zenith.

In the preferred form of our invention, however, taking into consideration the normal field of vision of a seated spectator, we have found that a projection screen extending through an arc of 180° in the horizontal plane, and extending through an arc of approximately 90° in the vertical plane is sufficient for all practical purposes. Thus, a screen in the form of a hollow quarter-sphere serves admirably for the purpose, and the invention will be hereinafter described with reference to a screen of this form, although it will be understood that it is not limited to this precise form either in extent or in shape, as screens extending through smaller arcs, both horizontal and vertical may be satisfactory for some purposes, and parabolic, elliptical or other curved shapes may, in some cases, be used to advantage.

Referring to the drawings, the screen 1, in the form of a hollow quarter sphere, is arranged with one of its edges 2 lying in a horizontal plane, and its other edge 3 lying in a vertical plane. The floor of the theater and the seats 4 for the spectators are arranged within the chord of the horizontal arc of the screen, so that the spectators are, in effect, surrounded on all sides and overhead by the screen. As shown, floor and seats are depressed somewhat below the plane of the screen edge 2, in order to avoid interference by the spectators with the projection beams as hereinafter explained.

Because of the relatively great area of the projection screen, as compared with ordinary screens, we propose to employ a plurality of projectors, each adapted to project against a predetermined area of the screen, the combined areas being sufficient, and arranged in such manner as to cover substantially the entire area of the screen. For purposes of illustration herein, I have employed four projectors, designated by numerals 6, 7, 8 and 9, but it will be understood that this number may be increased or decreased as desired. Projector 6 is directed and arranged to project against area 11 of the projection screen, the said area extending through an arc of approximately 60° in the horizontal plane, beginning at the left hand edge of the screen, and extending through an arc of approximately 45° in the vertical plane, beginning at the bottom of the screen. Projector 7 is directed and arranged to project against area 12 of the screen, the said area also extending through an arc of approximately 60° in the horizontal plane, beginning at the right hand edge of area 11, and extending through an arc of approximately 45° in the vertical plane, beginning at the bottom of the screen. Projector 8 is directed and arranged to project against area 13 of the screen, the said area also extending through an arc of approximately 60° in the horizontal plane, beginning at the right hand edge of area 12, and extending through an arc of approximately 45° in the vertical plane, beginning at the bottom of the screen.

Thus, the three projectors 6, 7 and 8 together project against an area extending through an arc of approximately 180° in the horizontal plane and extending through an arc of 45° in the vertical plane. This leaves an area 14 at the top of the screen extending through an arc of 180° in the horizontal plane and extending through an arc of 45° in the vertical plane. Projector 9 is directed and arranged to project against this area.

Each of the projectors 6, 7, 8 and 9 projects a separate film, of course, and it will be understood that in taking the pictures to be projected in accordance with our invention, a plurality of films are made, four in this case, with the field covered by the respective films corresponding to the projection areas 11, 12, 13 and 14 previously described. That is, the field covered by one film would correspond to the projection area 11, the field covered by another film would correspond to area 12 and so on. Furthermore, when it is desired that the action proceed from one screen area to another, a plurality of synchronously operated cameras may be used to make the separate films. All of the projectors 6, 7, 8 and 9 must be operated in synchronous relation. Since various devices, such as interlocked motors, are available commercially for operating a plurality of projectors synchronously, we do not illustrate or describe such mechanisms in detail herein.

In the foregoing description of the projection areas wherein it is stated that they extend through "approximately" a certain number of degrees in the horizontal plane and in the vertical plane, it should be understood that in order to avoid discontinuity of the complete image projected from the separate projectors, the projection areas should preferably overlap slightly. By using certain expedients well known in the art, such as "masking," the overlapping may be done in such manner that it is not observable to the spectator. Thus the effect to the spectator is that of a continuous single image.

For best results, it is desirable that the projectors be arranged in such manner that the axis of each projection beam passes through the approximate center of the curved surface against which it is projected. In the form illustrated, using a spherical shaped screen, the axes of the respective projection beams should, therefore, all pass through point 16, the common center of the projection surfaces. Furthermore, it is desirable that the projectors be spaced equidistantly from their respective projection areas. The projectors 6, 7 and 8, therefore, may be conveniently arranged in a horizontal arc, as illustrated, and located at a level such that the lower portions of the projection beams will be above the audience. The projector 9, however, should be depressed below the level of the other projectors as illustrated in Figure 2, in order to occupy the most desirable position.

It will be understood, also, that the lens systems of the projectors should be corrected in accordance with well known optical principles for proper projection on a curved surface.

In order to increase the illusion of being in and surrounded by an environment, we propose to use a separate sound track in connection with each of the films being projected and a separate sound reproducing apparatus controlled by each of said sound tracks. The loud speakers operated by said sound reproducing apparatuses are distributed at various points behind the screen, in order that the various sounds produced may produce binaural or directional effects. We preferably locate each loud speaker unit adjacent the projection area of the screen against which the image associated with the respective sound track is projected. Thus, we locate loud speaker units 21, 22, 23 and 24 behind the projection areas 11, 12, 13 and 14 respectively, and we connect the speaker 21 with the sound reproducing apparatus associated with projector 6 controlled by the sound track of the film being projected thereby. Likewise, we connect speaker 22 with the sound reproducing apparatus associated with projector 7 and so on.

The sound tracks recorded on each film may be recorded as the picture is being taken by means of separate microphones connected to separate sound recorders, or artificial sound effects may be introduced in the manner known in the art. In either case it is possible to secure binaural effects. Thus, if we assume that the image of a man is projected against projection area 11, the sound of the man's voice may be recorded entirely or preponderantly on the sound track of the film running through projector 6. The sound is reproduced by the sound reproducing apparatus associated with projector 6 and is delivered through load speaker 21. Thus, to the spectator, the sound appears to emanate from the man depicted.

Inasmuch as the drawings are semi-diagrammatic, no attempt has been made to illustrate in detail the structure of a suitable enclosure or building for housing the theater. However, a wall 26 is indicated below the screen for supporting the same and a wall 27 forms an enclosure around the projectors. A wall 28 of any desired extent may also be provided across the front of the theater having openings 29 for entrance and exit.

It will be understood that the invention may be variously modified and embodied within the scope of the subjoined claims.

We claim as our invention:

1. A motion picture theater comprising, in combination, a projection screen having a substantially spherical surface covering substantially the entire normal field of vision of a spectator, a plurality of projectors arranged to project images against contiguous areas covering substantially the entire surface of said screen, a separate sound reproducing apparatus operated in connection with each projector, a separate loud speaker operated by each said sound reproducing apparatus, each of said loud speakers being located adjacent a different projection area of said screen and distributed both horizontally and vertically around said screen, whereby a three dimensional directional sound effect is associated with a three dimensional visual effect.

2. A motion picture theater comprising, in combination, a projection screen having a substantially spherical surface covering substantially the entire normal field of vision of a spectator, a plurality of projectors arranged to project images against contiguous areas covering substantially the entire surface of said screen, a separate sound reproducing apparatus operated in connection with each projector, a separate loud speaker operated by each said sound reproducing apparatus, each of said loud speakers being located adjacent the area of the screen toward which its respective projector projects, said loud speakers being distributed both horizontally and vertically around said screen, whereby a three dimensional directional sound effect is associated with a three dimensional visual effect.

3. A motion picture theater comprising, in combination, a projection screen having a substantially spherical surface covering substantially the entire normal field of vision of a spectator, and a plurality of optically separate projectors arranged to project images against contiguous areas covering substantially the entire surface of said screen, each projector being located so that its axis of projection and a radius of curvature of the screen are coincident, and so that its distance from the screen along said axis is greater than said radius of curvature, a separate sound reproducing apparatus associated with some or all of the projectors, and a separate loud speaker operated by each of said sound reproducing apparatus, said loud speakers being distributed both horizontally and vertically around said screen, whereby a three dimensional directional sound effect is associated with a three dimensional visual effect.

4. A motion picture theater comprising, in combination, a projection screen having a substantially spherical surface covering substantially the entire normal field of vision of a spectator, and a plurality of optically separate projectors arranged to project images against contiguous areas covering substantially the entire surface of said screen, each projector being located so that its axis of projection and a radius of curvature of the screen are coincident, and so that its distance from the screen along said axis is greater than said radius of curvature, a separate sound reproducing apparatus associated with some or all of the projectors, and a separate loud speaker operated by each of said sound reproducing apparatus, each of said loud speakers being located adjacent the area of the screen toward which the corresponding projector projects, said loud speakers being distributed both horizontally and vertically around said screen whereby a three dimensional directional sound effect is associated with a three dimensional visual effect.

RALPH WALKER.
FRED WALLER.